Nov. 26, 1968   L. G. BECRAFT ETAL   3,413,211
PROCESS FOR IMPROVING THE QUALITY OF A CARBON BLACK OIL
Filed April 26, 1967
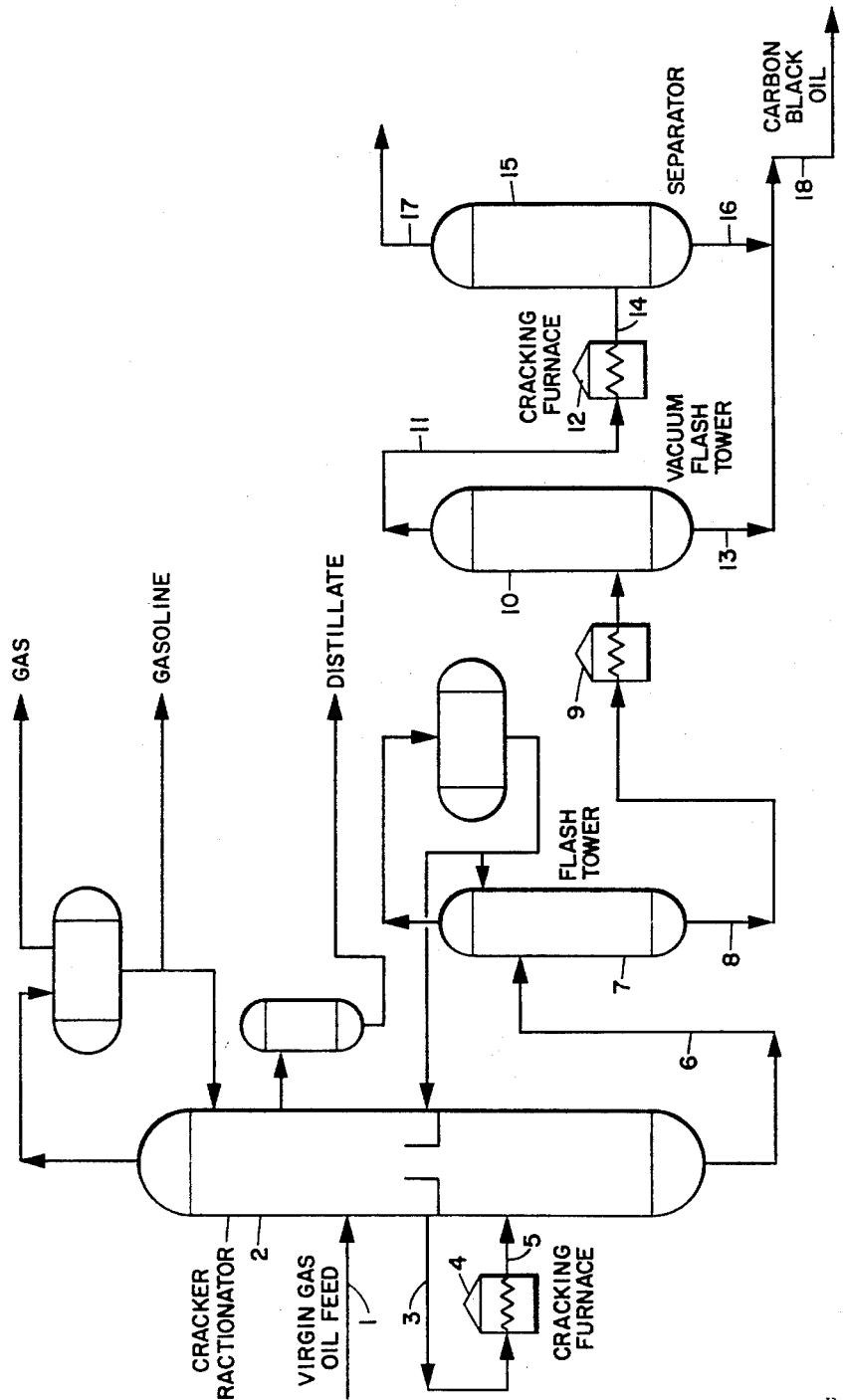
INVENTORS
LLOYD G. BECRAFT
JOSEPH R. KIOVSKY
BY
*Jerry B. Peterson*
ATTORNEY

United States Patent Office 3,413,211
Patented Nov. 26, 1968

3,413,211
PROCESS FOR IMPROVING THE QUALITY OF A CARBON BLACK OIL
Lloyd G. Becraft and Joseph R. Kiovsky, Ponca City, Okla., assignors to Continental Oil Company, Ponca City, Okla., a corporation of Delaware
Filed Apr. 26, 1967, Ser. No. 633,967
4 Claims. (Cl. 208—93)

ABSTRACT OF THE DISCLOSURE

A low-quality carbon black oil (hydrocarbon feedstock for the manufacture of carbon black) is improved by the following process: (1) the oil is subjected to a vacuum flash distillation; (2) the overhead from the flash distillation is thermally cracked; (3) a thermal tar is recovered from the thermal cracking step and is blended with the bottoms from the vacuum flash distillation to produce the improved carbon black oil.

Background

This invention is a process for improving the quality (Correlation Index) of a low-quality carbon black feedstock ("carbon black oil"). More specifically, the process involves the steps of subjecting the low-quality carbon black oil to a vacuum flash distillation, thermally cracking the overhead, and then recovering the thermal tar from the thermal cracking operation and blending it with the bottoms from the vacuum distillation.

Carbon black is especially useful as a filler to improve the wearing qualities of natural and synthetic rubber. The carbon black industry has shifted from the older natural gas processes to the use of modern furnaces which are designed to operate on various oil feedstocks. The demand for high quality carbon black oils is tending to outdistance the supply. This is aggravated by development of competing uses for the highly aromatic heavy oils, for example, for the production of premium grade coke.

The higher the carbon-to-hydrogen ratio of the oil, the higher will be the yield of black and also the higher the capacity of a given plant. The preferred feedstocks are rich in polycyclic aromatics because, in contrast to paraffins, heavy aromatics yield very little hydrocarbon gas upon pyrolysis; a high percentage of the contained carbon is yielded as black.

The carbon black oils are often produced by the thermal cracking of cycle oils, the tar from such thermal cracking operation being the carbon black oil. The cycle oils referred to are derived from thermal or catalytic cracking units. U.S. Patent No. 2,764,527 discloses the production of a carbon black feedstock by the thermal cracking of a cycle oil derived from a catalytic cracker. U.S. Patent No. 2,895,895 discloses the manufacture of carbon black oil by thermally cracking a mixture of a lube oil extract and a catalytic cycle oil.

The specifications for carbon black oils are quite important, particularly for carbon black used for rubber compounding. For example, if the asphaltene content of the oil is too high, the carbon black may contain grit, which is undesirable. Typical specifications for carbon black oil are as follows:

| | | |
|---|---|---|
| Gravity, °A.P.I. | max | 2.0 |
| Specific gravity | min | 1.0599 |
| Viscosity, SSU, at 210° F. | max | 80 |
| Viscosity, SSF at 122° F. | | 70/120 |
| Asphaltenes (pentane insolubles), percent by weight | max | 9.0 |
| Correlation index | min | 120 |
| Sulfur, percent by weight | max | 1.75 |

The Correlation Index referred to above was developed by the United States Bureau of Mines and denotes the aromaticity of an oil. The index is calculated from the formula:

$$C.I. = \frac{48640}{K} + 473.7G - 456.8$$

where:
C.I.=Bureau of Mines Correlation Index
K=average boiling point (° K.) of the fraction
G=specific gravity at 60° F./60° F.

Correlation index will hereinafter be referred to as BMCI.

Brief summary of the invention

This invention is the process of upgrading a low-quality carbon black oil comprising the steps of subjecting the oil to a vacuum flash distillation, thermally cracking the overhead, and then recovering the thermal tar from the thermal cracking operation and blending it with the bottoms from the vacuum flash distillation.

By "low-quality carbon black oil" we mean a heavy hydrocarbon oil having a 5 percent point of somewhere between 425° F. and 600° F., (more typically about 550° F.) and a BMCI of 90–115 (more typically about 100). A source of low-quality carbon black oil is the thermal tar from the conventional thermal cracking of a virgin gas oil.

The advantage of this process over subjecting the entire low-quality carbon black oil to a thermal cracking step is that fewer asphaltenes are formed for an equivalent BMCI. The process is particularly applicable to upgrading thermal tar produced from virgin feedstocks to an acceptable BMCI without an undue increase in asphaltenes.

Drawing

The drawing is a simplified flow diagram showing the preferred mode of carrying out the invention in a continuous operation including the preferred method of producing the low-quality carbon black oil.

Detailed description

Although batch operations are possible, a continuous process is of course much preferred.

The virgin gas oil fresh feed having a boiling range of about 400–1000° F. is introduced into the cracker fractionator 2 through line 1. The gas oil feed from the fractionator is passed through line 3 to cracking furnace 4 which is operated under conventional thermal cracking conditions: 300–800 p.s.i.g. back pressure and 850–1000° F. at the furnace outlet.

The effluent from the cracking furnace is introduced into the bottom of the fractionator through line 5. The gas and distillate products are removed from the top of the fractionator and the bottoms from the tower are passed to residuum flash tower 7 through line 6. Vapors from the flash tower are returned to the fractionator. The bottoms 8 from the flash tower 7 are a low-quality carbon black oil having a BMCI of 95–105. These bottoms are heated, if necessary, in heater 9 and passed to vacuum flash tower 10. The vacuum flash tower is designed and operated so as to produce a bottoms product (line 12) having a 5 percent point of 800–900° F., more typically 900° F. The vacuum flash tower overhead 11 (having a BMCI of about 80–95) is passed to cracker furnace 12 operating at the following conditions:

Pressure: 150–1000 p.s.i.g., preferably 350–650 p.s.i.g.
Temperature at outlet of heating tubes: 800–1000° F., preferably 850–925° F.
Temperature at outlet of soaking tubes: 850–1000° F., preferably 900–950° F.

Velocity througout coil (figured as feed liquid at 60° F.): 4–12 feet per second, preferably 6–8 feet per second.

The bottoms 13 from the vacuum flash tower have a BMCI of 110–160.

The effluent from the cracking furnace 12 is fed through line 14 to separator 15, which is designed and operated so as to produce a tar bottoms 16 having a 5 percent point falling between 500° F. and 600° F., more typically 550° F. This tar has a BMCI of 100–150, depending upon the BMCI of the material in line 8.

Bottom products 13 and 16 are blended to produce a carbon black oil 18 having a BMCI of about 100–150, depending upon but significantly improved over the low-quality material in line 8.

A material balance for the process shown in the drawing is as follows:

Low-quality carbon black oil (line 8): Gravity—6.4° API. Charge: 10,000 BPSD @ 60° F.; 150,000 lb./hr.

Vacuum flash overhead (line 11): Gravity—11.4° API. Rate: 6,340 BPSD @ 60° F.; 91,500 lb./hr.

Vacuum flash bottoms (line 13): Gravity—−2.5° API. Rate: 3,660 BPSD @ 60° F.; 58,500 lb./hr.

Cracked and topped vacuum flash overhead (line 16): Gravity—−1.0° API. Rate: 3,710 BPSD @ 60° F.; 58,600 lb./hr.

Separator overhead (line 17): Rate: 32,900 lb./hr.

Improved carbon black oil (line 18): Gravity—−1.8° API. Rate: 7,360 BPSD; 117,100 lb./hr.

The overhead 17 from the separator is then passed to an absorber or bubble tower (not shown) for separation into gas, gasoline, and gas oil.

*Examples*

Listed below are data obtained from pilot plant laboratory thermal cracking batch runs in a stirred autoclave, simulating the flow diagram shown in the drawing. The feedstock for Example 1 was the 550° F.+ bottoms from the thermal cracking of a virgin gas oil. The feedstock for Example 2 was a thermal tar manufactured from synthetic tower bottoms and cycle gas oil from a Thermofor catalytic cracking unit.

| Example | 1 | 2 |
|---|---|---|
| (A) Feedstock (corresponding to line 8): | | |
| BMCI | 97 | 118 |
| Asphaltenes, wt. percent | 2.87 | 6.1 |
| (B) Cracking conditions for whole stock (corresponding to line 8): | | |
| Temperature, ° F | 775 | 775 |
| Time, hours | 2.0 | 1.7 |
| Pressure, p.s.i.g | 500 | 500 |
| (C) Thermally cracked whole stock, 550° F.+ portion (corresponding to the cracking of all of the material in line 8): | | |
| BMCI | 125 | 135 |
| Asphaltenes, wt. percent | 18.8 | 16.5 |
| (D) Vacuum-flash overhead (550–830° F.) (corresponding to line 11): BMCI | 86 | 106 |
| (E) Vacuum-flash bottoms (830° F.+) (corresponding to line 13): | | |
| BMCI | 123 | 147 |
| Asphaltenes, wt. percent | 15.1 | 38.1 |
| (F) Cracking conditions for overhead: | | |
| Temperature, ° F | 800 | 800 |
| Time, hours | 2.5 | 2.2 |
| Pressure, p.s.i.g | 500 | 500 |
| (G) Cracked overhead, 550° F.+ portion (corresponding to line 16): | | |
| BMCI | 128 | 133 |
| Asphaltenes, wt. percent | 10.9 | 9.2 |
| (H) Blend of 550° F.+ portion of cracked overhead and vacuum-flash bottoms (corresponding to line 18): | | |
| BMCI | 125 | 135 |
| Asphaltenes, wt. percent | 11.2 | 12.4 |

It is readily apparent from the above data that the blended product is superior to the thermally cracked whole stock because of the lower asphaltene content for the same BMCI. Specifically, it should be noted from Example 1 (item C), that thermally cracking the entire material in line 8 would result in a BMCI of 125 and an asphaltene content of 18.8, but that by vacuum flashing such material, cracking the overhead, and blending the cracked overhead with the bottoms from the vacuum flash, an asphaltene content of only 11.2 can be obtained with the same BMCI (see item H). The same improvement is apparent in Example 2 from a comparison of items C and H.

Thermal cracking on a continuous thermal cracking unit is less prone to produce asphaltenes, but the above trends still apply.

While specific details of the preferred mode of operation have been given in the foregoing for purposes of illustration, it is to be understood that the invention is not limited thereby, but is to be taken as limited solely by the language of the appended claims.

We claim:

1. A process for upgrading a low-quality hydrocarbon oil having a BMCI of 90–115 and a 5 percent point of 425–600° F. comprising the steps of subjecting said oil to a vacuum flash distillation to recover a bottoms having a 5 percent point of about 800–900° F.; thermally cracking the overhead from the vacuum flash distillation step; recovering from the thermal cracking effluent a thermal tar having a 5 percent point of about 500–600° F.; and blending said thermal tar with said vacuum flash distillation bottoms to produce a carbon black oil having a BMCI substantially greater than the BMCI of said low-quality hydrocarbon oil.

2. The process of claim 1 in which the low-quality hydrocarbon oil is a thermal tar from the conventional thermal cracking of a virgin gas oil.

3. A process for upgrading a low-quality hydrocarbon oil having a BMCI of 90–115 and a 5 percent point of about 550° F. comprising the steps of: subjecting said oil to a vacuum flash distillation to recover a bottoms having a 5 percent point of about 900° F.; thermally cracking the overhead from the vacuum distillation step; recovering from the thermal cracking effluent a thermal tar having a 5 percent point of about 550° F.; and blending said thermal tar with said vacuum flash distillation bottoms to produce a carbon black oil having a BMCI substantially greater than the BMCI of said low-quality hydrocarbon oil.

4. The process of claim 3 in which the low-quality hydrocarbon oil is a thermal tar from the conventional thermal cracking of a virgin gas oil.

No references cited.

DELBERT E. GANTZ, *Primary Examiner.*

H. LEVINE, *Assistant Examiner.*